March 6, 1956 F. W. DUHAN 2,737,137
CAN SEAMING MACHINE
Filed Nov. 8, 1951 7 Sheets-Sheet 1

INVENTOR:
Frederick W. Duhan,
BY Cushman, Darby & Cushman
ATTORNEYS.

March 6, 1956  F. W. DUHAN  2,737,137
CAN SEAMING MACHINE
Filed Nov. 8, 1951  7 Sheets-Sheet 2

INVENTOR:
Frederick W. Duhan,
BY Cushman, Darby & Cushman
ATTORNEYS.

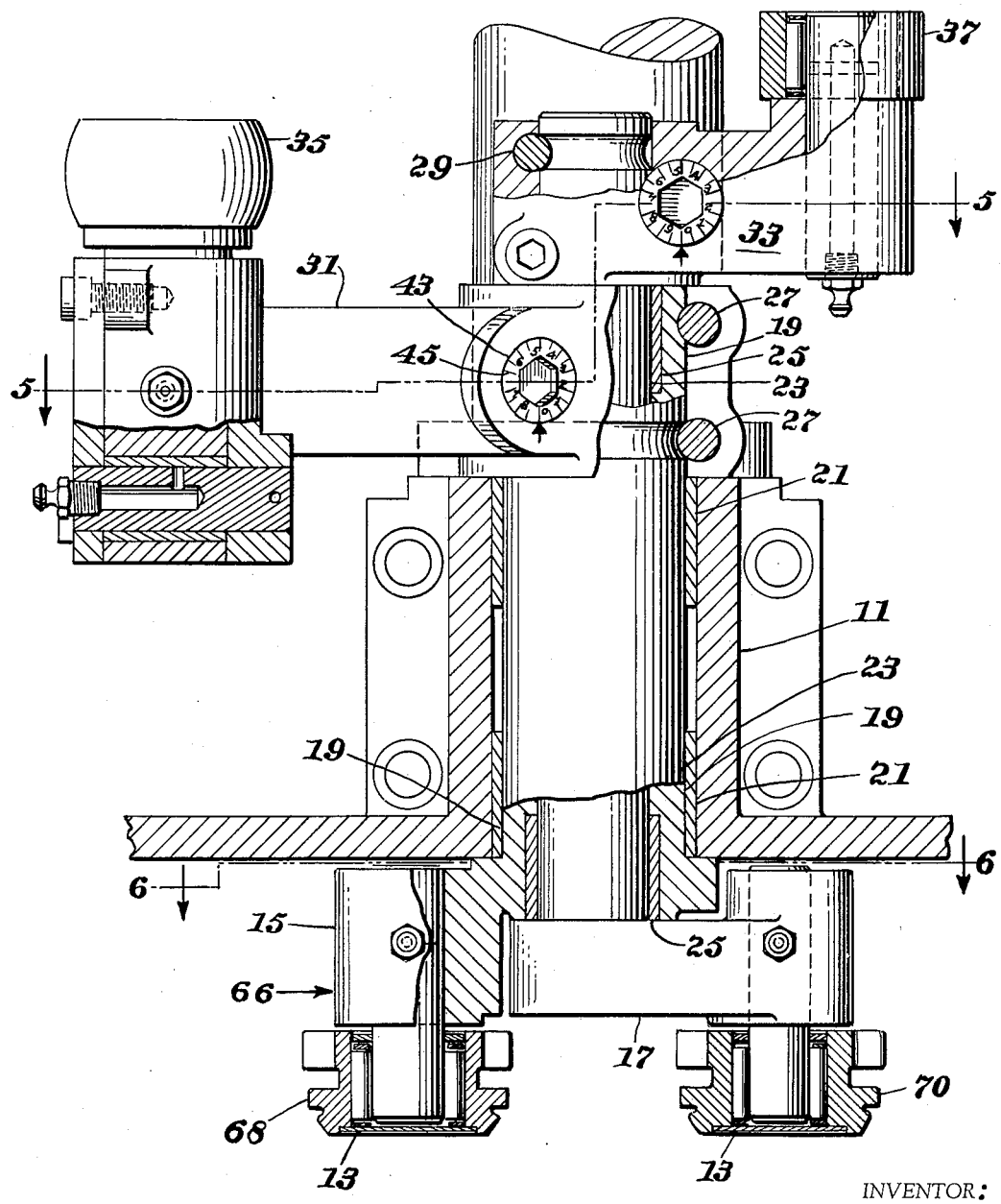

March 6, 1956 F. W. DUHAN 2,737,137
CAN SEAMING MACHINE
Filed Nov. 8, 1951 7 Sheets-Sheet 4
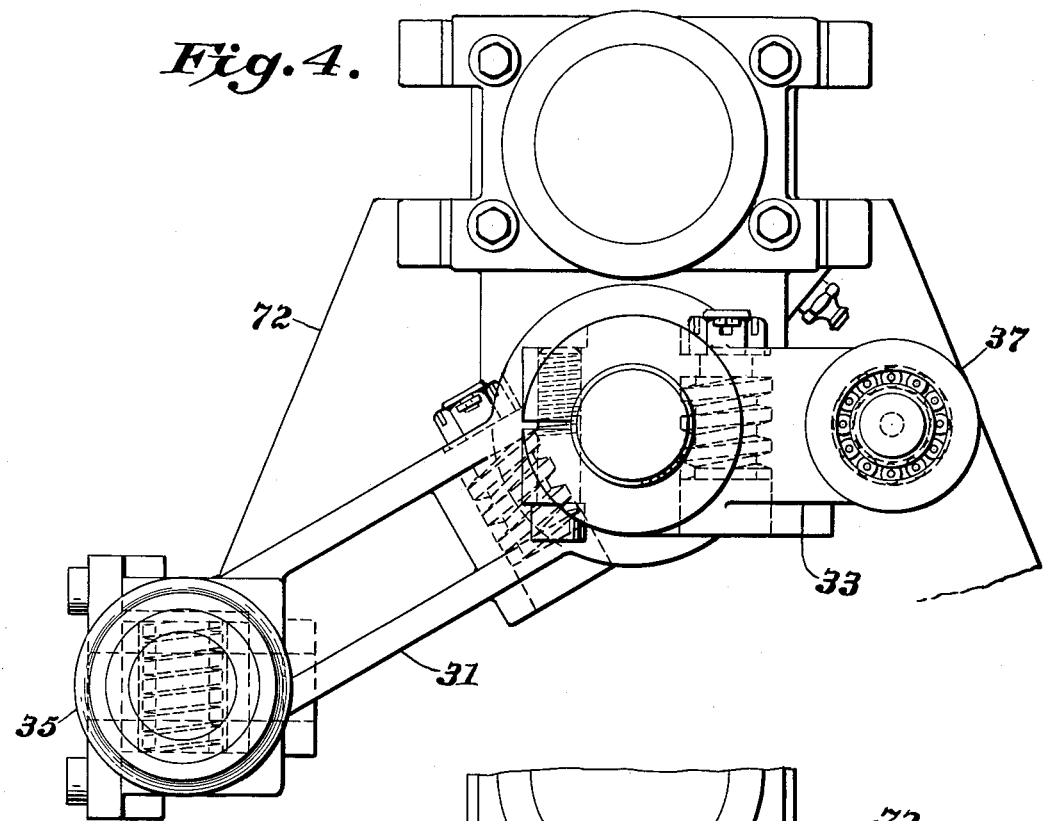
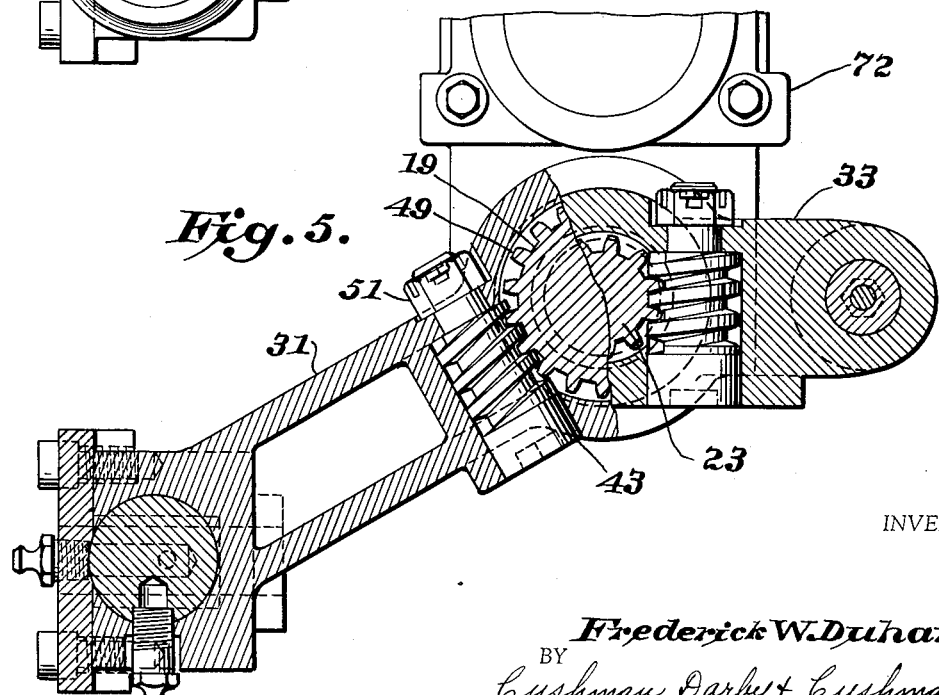
INVENTOR:
Frederick W. Duhan,
BY Cushman, Darby & Cushman
ATTORNEYS.

March 6, 1956  F. W. DUHAN  2,737,137
CAN SEAMING MACHINE
Filed Nov. 8, 1951  7 Sheets-Sheet 5

INVENTOR:
BY Frederick W. Duhan,
Cushman, Darby & Cushman
ATTORNEYS.

March 6, 1956 F. W. DUHAN 2,737,137
CAN SEAMING MACHINE
Filed Nov. 8, 1951 7 Sheets-Sheet 6

INVENTOR:
Frederick W. Duhan,
BY Cushman, Darby & Cushman
ATTORNEYS.

March 6, 1956  F. W. DUHAN  2,737,137
CAN SEAMING MACHINE
Filed Nov. 8, 1951  7 Sheets-Sheet 7

INVENTOR:
Frederick W. Duhan,
BY Cushman, Darby & Cushman
ATTORNEYS.

United States Patent Office 2,737,137
Patented Mar. 6, 1956

2,737,137

CAN SEAMING MACHINE

Frederick W. Duhan, Philadelphia, Pa., assignor, by mesne assignments, to Crown Cork & Seal Company, Inc., Baltimore, Md., a corporation of New York Application November 8, 1951, Serial No. 255,488

7 Claims. (Cl. 113—23)

The present invention relates to a machine for uniting a can cover with a filled can body by means of a first operation seaming roller and a second operation seaming roller. Although the machine disclosed in the specification is used for seaming a can end to a filled can body, it will be obvious that the machine may be used in seaming cylindrical can walls to the can bottom in the manufacture of can bodies.

An object of the invention is the provision of a common bearing support for shafts of the lever arms of each of the seaming rollers. By providing a common bearing support for the shafts of the lever arms of each seaming roller, the can seaming machine has a sturdy construction together with compactness of design. This is important where space in a canning factory must be utilized to its greatest extent.

A further object of the invention is the provision of concentric, telescoping bearings and shafts of the lever arms of the seaming rollers in a common bearing support. This provision, as well as conserving space, allows all parts needed in seaming a can cover to a can body to be assembled into one separate and compact seaming head casing. Thus, the seaming head casing may be replaced or changed as a unit when the machine is being converted for different size cans or when a new seaming head is needed without an appreciable loss in time.

Another object of the invention is to provide braking means for the freely rotating lower chuck. Braking action is necessary after a filled can body has been closed and removed from the machine and prior to the feeding of a filled can body onto the chuck. The braking of rotation of the lower chuck at this time prevents the can body from tipping or spilling its contents when it is transferred from an infeed conveyor onto the lower chuck.

A still further object of the invention is the provision of braking means for the knockout pad shafts of the upper chuck assembly. After a can has been closed and discharged and before a filled can body is fed into the machine, it is highly desirable to stop the rotation of the freely rotating knockout pad shaft in order that maximum performance may be obtained.

These and other objects of the invention will appear more clearly from the accompanying drawings in which:

Figure 3 is an enlarged vertical sectional view similar to Figure 2 but taken on a line at a substantial angle to Figure 2.

Figure 4 is a plan view of Figure 3.

Figure 5 is a horizontal sectional view taken on lines 5—5 of Figure 3.

Figure 1:
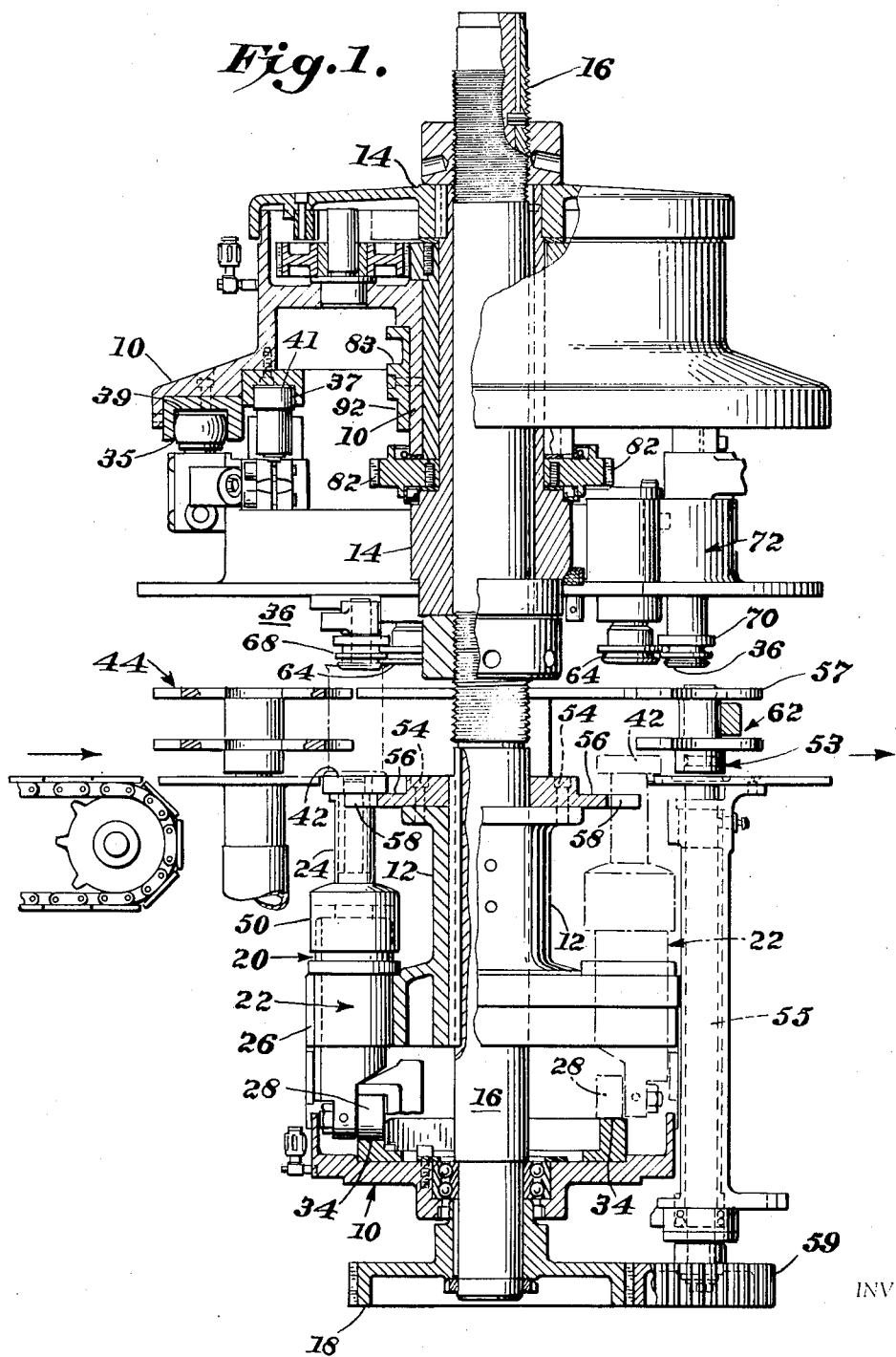
Figure 1 is a vertical sectional view with parts in elevation of a can seaming machine.

In the preferred embodiment of the invention as shown in the drawings, the can seaming machine is of the type wherein a can body and can end are united by rotating them against a first operation seaming roller and a second operation seaming roller. As distinguished from the older and more cumbersome seaming machines, where the seaming rollers are rotated about a stationary can body and can end, the present machine is more efficient, sturdy and compact. A faster seaming of can bodies to can ends is obtained without the danger of spilling the contents of the filled can body.

Filled can bodies are fed from a filling table or can filling machine by any of the conventional means such as a screw, belt, or chain link type of conveyor or the like, to the infeed station of the can seaming machine. At the same time, can ends are fed from a can end embossing machine, like the one shown in my pending application for Letters Patent, Serial No. 241,195, filed August 10, 1951, to a station where they are transferred onto the filled can bodies. This station may be just prior to the infeed transfer station of the can seaming machine. At the infeed station of the can seaming machine, the can bodies and their respective can ends are transferred onto a chuck carried by a lower rotating turret assembly. The chuck will then raise vertically and the can body and can end will engage the can seaming mechanism where the seaming operation takes place. After the can body has been united with the can end, the can supporting chuck will then lower and the can will be transferred from the can seaming machine to a conveyor or the like which will convey the can to any suitable labeling and/or casing machine.

Referring specifically to the drawings wherein like characters or reference numerals represent like or similar parts, the can seaming machine is comprised of a stationary supporting frame 10 and lower and upper rotating supporting frame 10 and lower and upper rotating turrets 12 and 14 respectively. The lower and upper rotating turrets 12 and 14 are suitably mounted in bearings for rotation with respect to the stationary supporting frame 10 and are splined or keyed to a vertical central rotating shaft 16 and thus the lower and upper rotating turret assemblies will rotate at the same speed. Keyed to the lower end of the shaft 16 is a drive gear 18 which may be driven by any suitable source of power such as an electric motor or the like (not shown).

Figure 10:
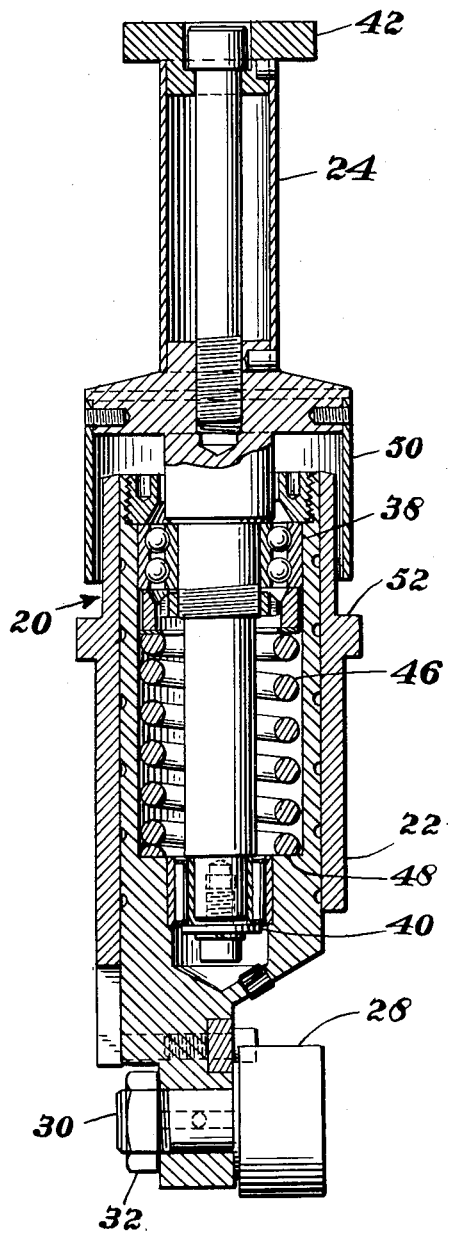
Figure 10 is an enlarged vertical sectional view of the lower chuck assembly as illustrated in Figure 1.
Figure 11:
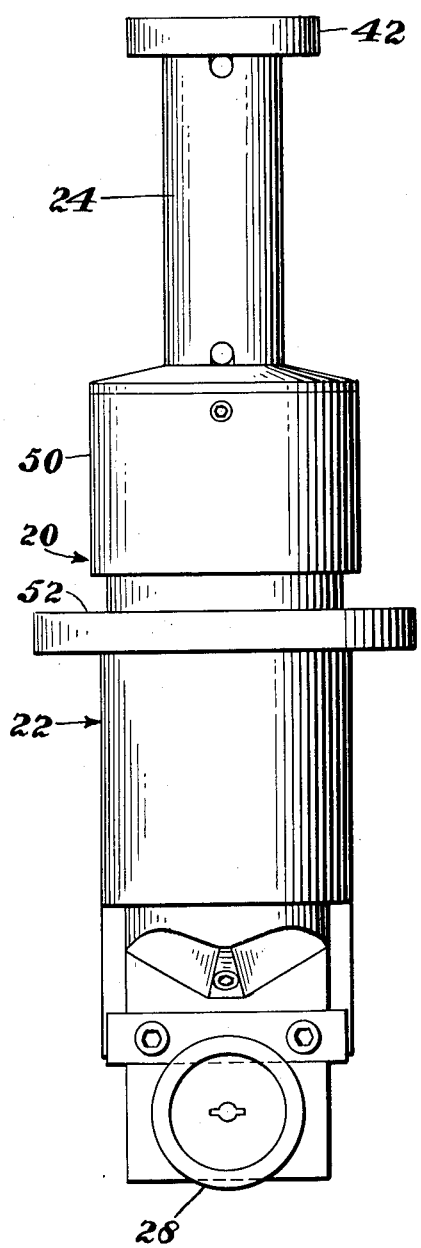
Figure 11 is a right-side elevation of Figure 10.

The lower rotating turret assembly 12 which is splined to the vertical shaft 16 carries a plurality of lower chuck assemblies 20 for supporting the can bodies during the seaming operation. As shown in detail in Figures 10 and 11, the lower chuck assembly 20 comprises a base or chuck supporting member 22 and a freely rotating chuck 24. The base or chuck supporting members 22 are carried in a plurality of apertures 26 located on the periphery of the lower turret assembly 12. Any suitable bearing means may be provided in the apertures so that the chuck assemblies 20 may be vertically raised and lowered in the cycle of the seaming operation. Carried on the lower end of the base member 22, is a roller 28 which performs the function of cam follower. The roller 28 may be suitably mounted on the base member by means of the bolt 30 and nut 32. The roller 28 is adapted to cooperate with the circumferential cam 34 mounted on the stationary supporting frame 10. The cam 34 is designed to impart vertical movement to the chuck assembly 20 during the seaming cycle since the can bodies must be raised to engage the can seaming mechanism 36 carried in the upper turret 14.

Carried on the upper portion of the base member 22 of the lower chuck assembly 20 is a freely rotating chuck 24. The freely rotating chuck 24 is mounted in the floating bearing 38 and the roller bearing 40. Any suitable platform 42 may be fixed to the chuck 24 for receiving the filled can bodies from the infeed station 44. In addition to the chuck 24 being freely rotatable with respect to the base member 22 and the lower turret 12, the chuck is also resiliently mounted in the base member 22. The purpose of resiliently mounting the chuck 24 is obvious in that the can seaming mechanism 36 will not be damaged should the conditions arise where a larger size can is inadvertently fed into a machine or a can is tipped on the platform 42. The resilient means of mounting the chuck 24 in the base member 22 comprises a heavy coil spring 46 mounted between the floating bearing 38 and a shoulder 48 of the base member 22. A cylindrical shield 50 fastened to the chuck 24 will protect the bearing and moving parts of the chuck assembly 20 from dirt and foreign matter of any kind. Another purpose of the coil spring 46 is that it acts to cushion the vertical movement of the can body on the chuck assembly 20 when the can body is raised into engagement with the can seaming mechanism 36.

Bolted to the lower turret assembly by means of the bolts 54 is a radially extending flange 56. A plurality of pockets or arcuate shaped cutouts 58 are provided in the periphery of the circumferential flange 56 for reception of the freely rotatable chucks 24. One pocket is provided for each chuck 24. Since the chuck 24 will rotate when a can body is raised into engagement with the upper rotating seaming chuck member 64, it is desirable to have means for braking this rotation after the can is lowered and discharged and before another filled can body is transferred into position, as rotation of the chuck 24 at the infeed station 44 will cause tipping and spilling of the filled can body. Braking action of the rotatable lower chuck is obtained by making the depression in the cam 34 lower than is normally necessary to lower the chuck assembly 20. This lower depression in the cam 34 is made between the discharge station 62 and the infeed station 44 and thus between these points, the bottom surface of the platform 42 will frictionally engage the surface of the flange 56. This frictional engagement will stop rotation of the freely rotatable chuck 24 and will allow another can body to be fed safely into the machine. The surfaces of the flange 56 and the platform 42 may be covered with any of the known braking materials such as rubber, neoprene, cork composition or the like.

The upper turret 14 which is also splined or keyed to the vertical drive shaft 16 carries the seaming mechanism 36 for uniting the can ends to the filled can bodies. Included in the seaming mechanism 36 are a plurality of positively rotating chuck members 64 and a plurality of seaming heads 66. A single seaming head 66 and a rotating chuck member 64 are provided on the upper turret for cooperating with each lower chuck 24.

Figure 2:
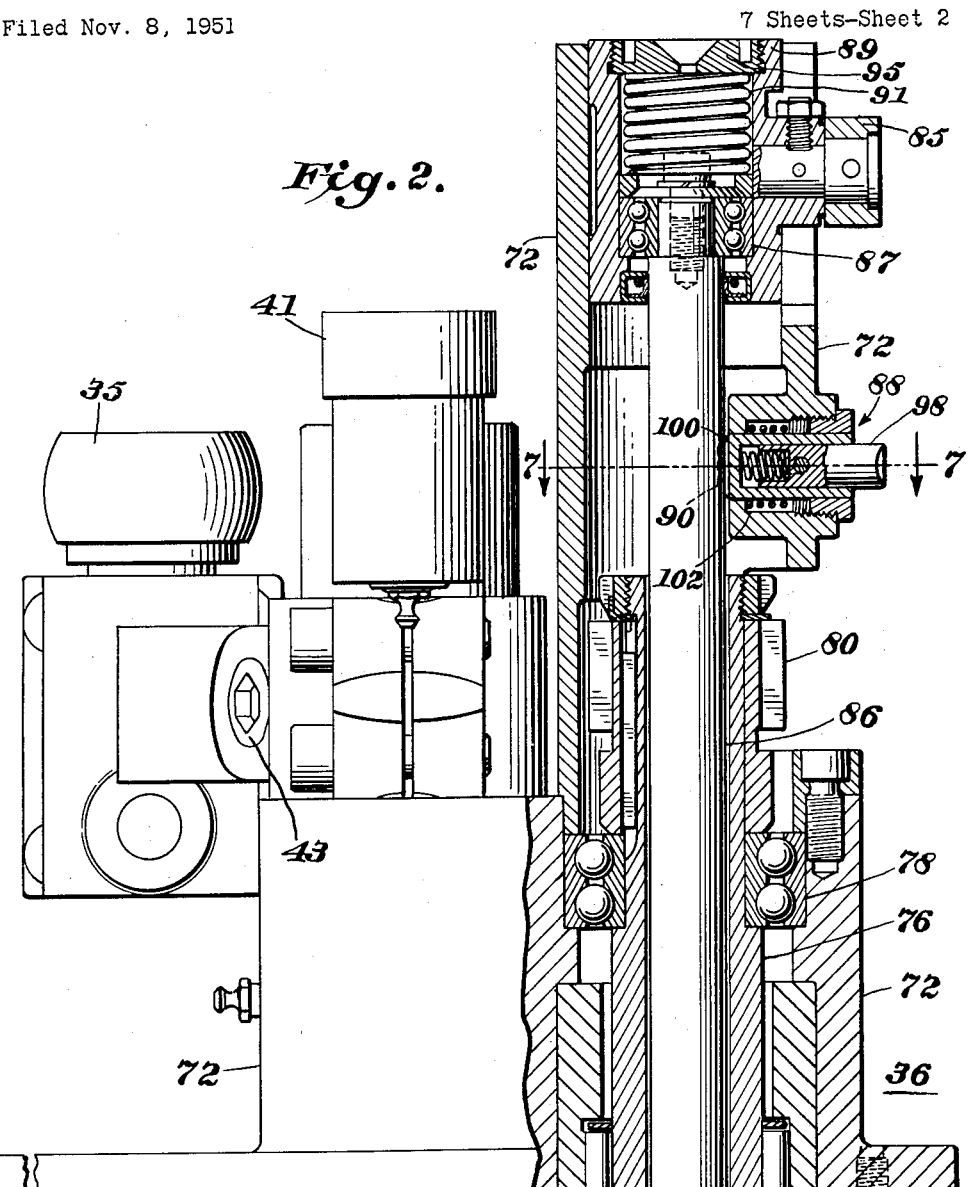
Figure 2 is an enlarged vertical sectional view with parts in elevation of one of the seaming heads.

Since the can seaming machine is of the type wherein a first operation seaming roller 68 and a second operation seaming roller 70 are used in seaming the can end to the filled can body, means must be provided for rotating the can end and can body at a high speed. Positively driven rotating chuck members 64 are provided for rotating the can ends and filled can bodies on the lower chucks 24. The can ends and can bodies are fed onto chucks 24 of the lower rotating turret and are raised into position to engage the upper or positive driven rotating chuck members 64 carried by the upper rotating turret 14 and the pressure of the upper chuck members 64 on the can end and body units will cause them to rotate as the turrets rotate. The upper rotating chuck members 64 are carried in a housing 72 bolted or secured to upper rotating turret 14. As best shown in Figure 2, the chuck member 64 includes a rotating head or chuck 74, attached to a hollow shaft 76 which rotates in the bearings 78 mounted in the housing 72. Gear teeth 80 are provided on the upper end of the shaft 76 and are adapted to engage a circumferential gear track 82, carried by the stationary supporting frame 10. Thus it is easily seen that when the upper turret 14 rotates carrying with it the chuck member 64, the gear teeth 80 (Fig. 2) will engage the track 82 (Fig. 1) and will rotate the chuck member 64.

The chuck member 64 carries a knockout shaft 86 within the hollow shaft 76 which is adapted to move vertically downward at the end of the can seaming operation in order to disengage the can from the chuck 74. The upper end of the knockout shaft 86 is mounted in bearings 87 supported in a piston assembly 89 which will move vertically in the housing member 72. A compression spring 91 mounted between a plug 95 in the piston assembly and the bearings 87 allows for any needed cushioning effect of the knockout shaft and also translate vertical movement to the knockout shaft 86. A roller 85 is mounted on the piston assembly 89 and cooperates with the cam track 83 supported on the stationary frame 10. The cam track 83 will thus impart vertical movement to the knockout shaft 86 through the cam follower or roller 85, piston assembly 89, the compression spring 91 and the bearings 87.

The lower end of the knockout shaft 86 has a knockout pad 84 mounted thereto for engagement with the can top. Since the knockout pad 84 will engage the top of the can while the can is rotating, the knockout pad 84 and shaft 86 will also rotate. It is highly desirable to stop rotation of the knockout pad 84 and shaft 86 before another filled can body is fed into position, therefore braking means for the shaft 86 are provided. Mounted in the housing 72 is a frictionally engaging brake assembly 88 shown in Figures 2, 7, 8 and 9. The brake assembly 88 consists of a spring loaded plunger 90 which is actuated by a cam segment 92 (Figure 1) mounted on the stationary supporting frame 10 for frictionally engaging the knockout shaft 86. The plunger 90 is hollow and has an elongated slot 94 mounted in its walls for receiving the pin 96. The pin 96 carries the cam follower 98 which engages the cam segment 92. When the cam segment 92 is engaged by the cam follower 98, the pin 96 is carried inwardly and the spring 100 is compressed. This causes the plunger 90 to engage the knockout shaft 86. At this point further inward movement of the cam follower 98 will compress the spring 102 and the braking action will occur. After the cam follower 98 passes the high point on the cam segment 96, the springs 100 and 102 will return the plunger 90 to the disengaged position. Because of the compensating springs 100 and 102, the brake assembly 88 will compensate for wear of the plunger 90.

The housing 72 mounted on the upper turret 14 carries the bearing supports 11 for each of the can seaming heads 66 as well as housing the upper seaming chuck assemblies 64 and the knockout pads 84 and shafts 86. In this type of can seaming machine, it is only necessary to have two seaming rollers in each seaming head to perform the seaming operation. The first seaming roller bends the periphery of the can end over the top of the can body while the second seaming roller completes the operation of seaming the can end to the can body. It is important that the seaming rollers be sturdily supported for engagement with the can ends and body so that a uniform seal may be obtained and it is also equally important that the support be compact without a loss of rigidity. Therefore, in the present invention a bearing support 11 is provided for supporting both the first operation seaming roller 68 and the second operation seaming roller 70. Since each seaming head is identical, only one will be described.

Referring specifically to Figures 3, 4, 5 and 6, each seaming roller is supported for rotation in roller bearing 13 on the lever arms 15 and 17. Lever arm 15 supports the first operation seaming roller 68 while lever arm 17 supports the second operation seaming roller 70. The shaft 19 of the lever arm 15 is hollow and is mounted in the bearing support 11. Suitable bearings 21 are provided between the shaft 19 and the housing member 72 in order that the shaft 19 may rotate and thus impart arcuate movement to the seaming roller 68. The shaft 23 of the lever arm 17 is solid and is adapted to telescope with the hollow shaft 19. Bearings 25 are provided between the shafts 19 and 23 so that the shaft 23 may impart arcuate movement to the roller 70. O-rings 27 and 29 lock the shafts 19 and 23 respectively within the bearing support 11. It is thus seen that there is a common bearing support 11 for the bearings 21 and 25 and shafts 19 and 23 which support the lever arms 15 and 17 of the first and second seaming rollers 68 and 70 respectively. It might also be well to note that the bearings 21 and 25 and the shafts 19 and 23 telescope and are concentric with each other. This feature insures rigidity as well as compactness of design and allows the seaming heads to be mounted closer together.

Extending radially from the axis of the shafts 19 and 23 are cam arms 31 and 33 respectively. At end of each of the cam arms 31 and 33 are mounted cam follower rollers 35 and 37 which cooperate with the cam tracks 39 and 41 respectively, carried by the stationary supporting frame 11. The cam tracks 39 and 41 impart angular movement to the can seaming rollers 68 and 70 respectively through the rollers, cam arms, shafts and lever arms. The cams will thus bring the seaming rollers 68 and 70 into engagement with the can end and can body when the seaming operation begins.

Figure 14:
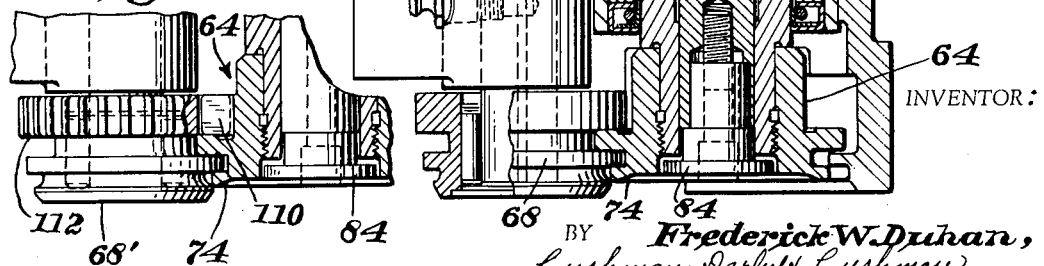
Figure 14 is a fragmental sectional view of a modified seaming head.
Figure 6:
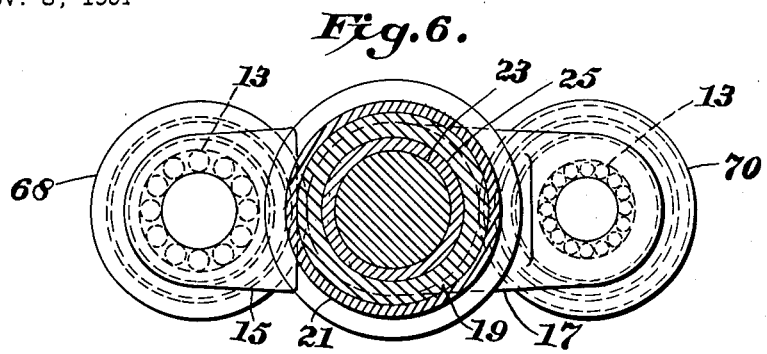
Figure 6 is a horizontal sectional view taken on the line 6—6 of Figure 3.
Figure 7:
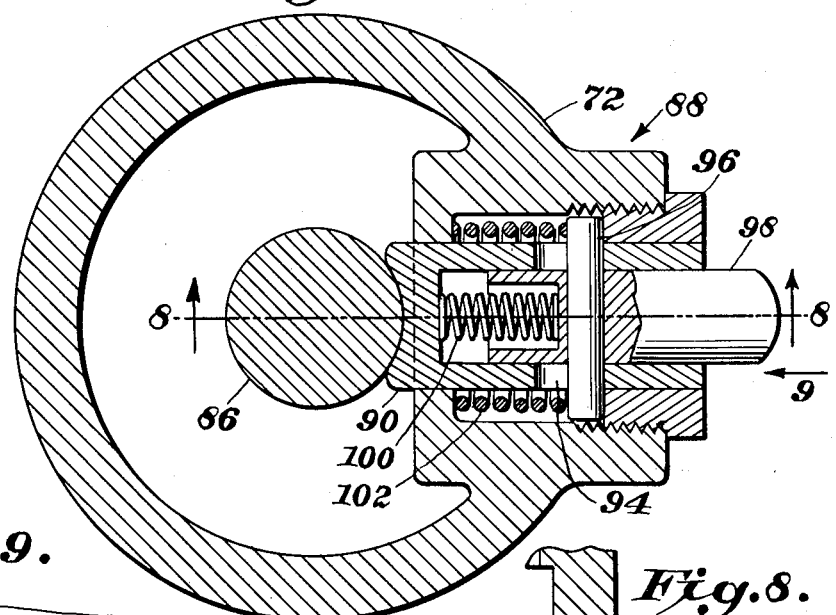
Figure 7 is an enlarged horizontal sectional view taken on the line 7—7 of Figure 2.
Figure 9:
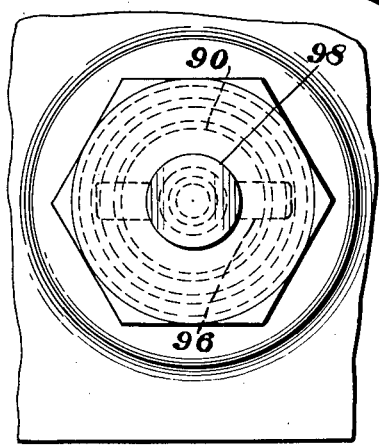
Figure 9 is a fragmental end view looking into the direction of the arrow 9 of Figure 7.
Figure 8:
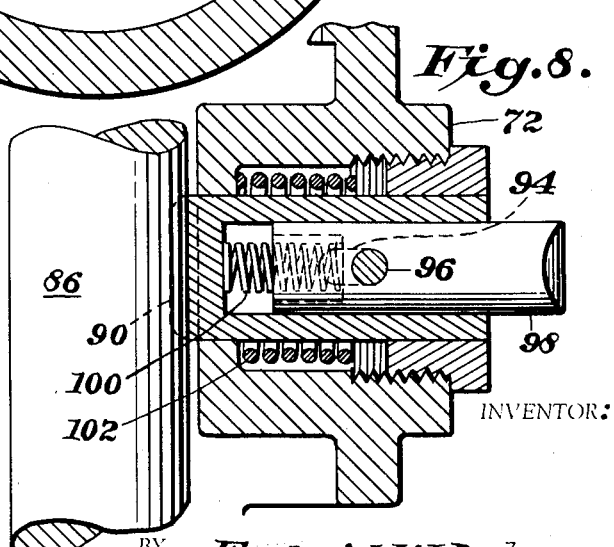
Figure 8 is a fragmental sectional view taken on the line 8—8 of Figure 7.

For most sizes of cans, the rollers 68 and 70 need not be positively driven as the rotation of the can and the chuck member 64 is sufficient to impart rotation to the seaming rollers. However, when seaming a small diameter can, the can end has a tendency to slip around the chuck member 64 and the seaming rollers 68 and 70 and to overcome this objection, positively driven seaming rollers are provided. Figure 14 discloses the modified form of seaming rollers having a positive drive. Since the drive for seaming rollers 68 and 70 is the same, only the drive for roller 68 is disclosed in the drawings. Mounted on the upper portion of the seaming roller 68 is a gear 112 which will mesh with a gear 110 carried by the positively driven chuck member 64, when the seaming head 66 is in the seaming position. Since the chuck member 64 is positively driven, as previously explained in specification, it will in turn drive the rollers 68 and 70 and there will be no slippage of the can end. As is shown in Figure 14, the teeth of gears 110 and 112 are long and, consequently, have sufficient working depth to permit the gears to remain in mesh when the seaming rollers are in inoperative position.

An adjustment of angular relation between the cam arms and the lever arms of the seaming rollers is provided. Since this adjustment is the same with respect to each seaming roller and its corresponding cam arm, only one will be herein described. As best shown in Figures 4 and 5, an adjustment screw 43, having an Allen type head and a gauge or indicator 45 thereon, is mounted in the cam arm 31. The threads 47 of the screw 43 are adapted to engage a spline 49 on the shaft 19. Movement of the screw 43 in either direction will adjust the angle between the cam arm 31 and the lever arm 15 which carries the seaming roller 68. The screw is then locked in place by means of the nut 51 and the angle will remain constant. Since different diameter cans may be used in a day's operation, it is necessary that this adjustment may be quickly and efficiently made.

As is apparent from the preceding description, the seaming head 66 may be replaced as a unit from the machine if a new seaming head is desired or cans of a different height are to be used since the seaming head is merely bolted to the housing 72 of the upper turret assembly 14.

Figure 12:
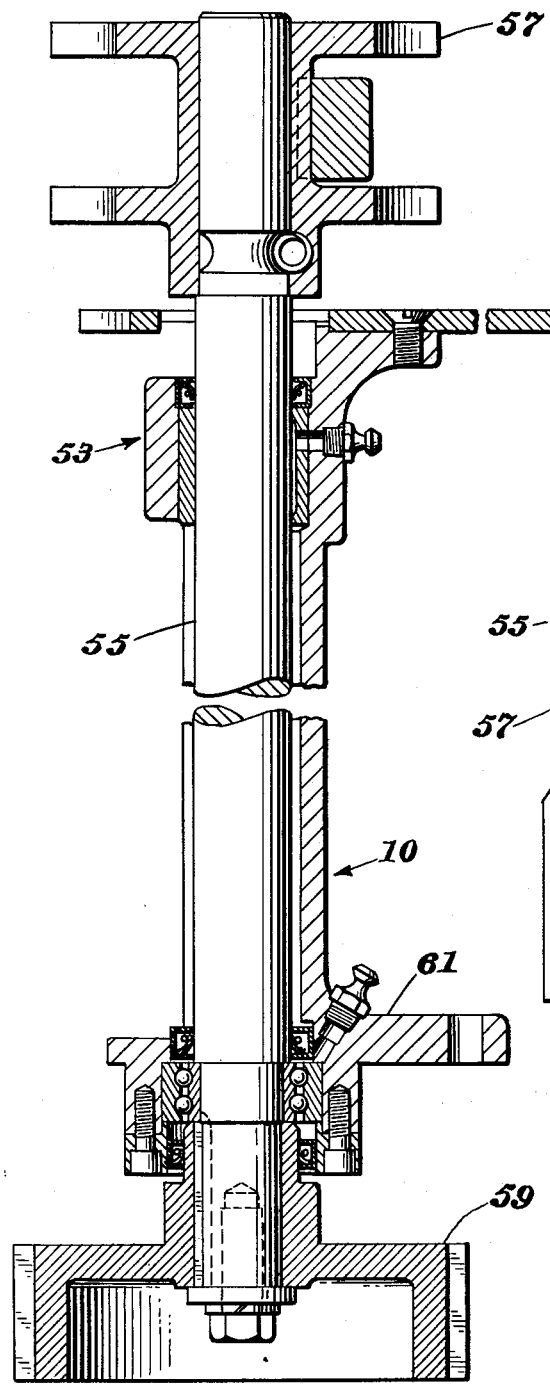
Figure 12 is an enlarged vertical sectional view of the discharge station.
Figure 13:
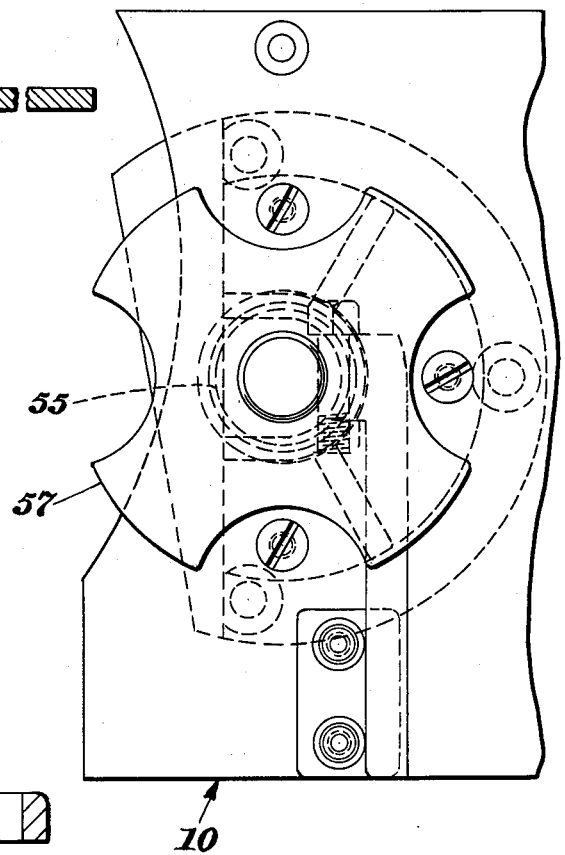
Figure 13 is a fragmental plan view of Figure 12.

After a can is closed it must be discharged from the can seaming machine to a conveyor which will transfer it to the next phase of canning operation which may be labeling and/or casing the cans. At the discharge station 62 there is provided a discharge mechanism 53 which is best shown in Figures 12 and 13. This mechanism consists of a rotating shaft 55 having a star wheel 57 mounted on its upper end and a gear 59 keyed to its lower end. The shaft 55 is supported for rotation in bearings 61 mounted in the stationary supporting frame 10. The gear 59 meshes with the drive gear 18 and thus drives the discharge star wheel in timed relationship with the lower turret assembly 12. When a can reaches the discharge station it is swept off the chuck 24 and onto an outfeed conveyor (not shown) by means of the star wheel 57.

The terminology used in the specification is for the purpose of description and not for limitations, as the scope of the invention is defined in the claims.

I claim:

1. In a seaming head, a housing, a hollow rotatable chuck carried by said housing, a first operation seaming roller and a second operation seaming roller carried in said housing adjacent to said chuck, a freely rotatable knockout shaft axially mounted within said rotating chuck, brake means operatively associated with said freely rotatable knockout shaft for stopping rotation of the same, said brake means including a cam segment, a resiliently mounted plunger carried by said housing adjacent said knockout shaft for frictional engagement with said knockout shaft when operated by said cam segment.

2. In a seaming head, a housing, a rotatable chuck carried by said housing, a first operation seaming roller and a second operation seaming roller mounted adjacent said rotating chuck, means for mounting said first operation seaming roller and said second operation seaming roller on the same pivotal axis and for independent movement, said means including a bearing support mounted in said housing, a pair of concentric telescoping shafts supported in said bearing support, a lever arm extending radially from the lower end of each shaft and supporting one of said seaming rollers, an arm extending radially from the upper end of each of said shafts, cam followers mounted on each of said upper arms, and cam means cooperating with each of said cam followers whereby said first operation seaming roller and said second operation seaming roller are moved independently into and out of seaming position.

3. In a seaming head of the type in claim 2 wherein said arms supporting the cam followers are adjustable radially to the radial extending lever arms whereby relative independent movement of the seaming rollers is changed.

4. In a can closing machine for seaming a can end on a can body, an infeed station and a discharge station, a supporting frame, upper and lower rotating turrets carried in said frame, a seaming mechanism carried by said upper turret, a plurality of freely rotatable can body and can end supporting chucks mounted in said lower turret for receiving the can end and can body from said infeed station and vertically raising the same into engagement with said can seaming mechanism, said seaming mechanism including a housing, a plurality of rotating chucks mounted in said housing for rotating the can end and can body, first and second operation seaming rollers mounted adjacent to each of said chucks, a freely rotatable knockout shaft axially mounted within each of said rotating chucks, each of said knockout shafts being reciprocated with respect to its rotating chuck for disengaging the can end and can body after a seaming operation, brake means mounted on said housing and engaging and stopping rotation of said knockout shafts after the can end and body have been ejected therefrom, and brake means to stop rotation of said freely rotatable can body supporting chucks when the can body and can end have been transferred to the discharge station.

5. A can closing machine of the character described in claim 4 wherein said brake means for stopping rotation of said knockout shafts includes a cam segment mounted on said frame, a resiliently mounted plunger carried in said upper turret and operated by said cam segment, said resiliently mounted plunger engaging said knockout shaft to frictionally stop the same.

6. In a can closing machine, an in-feed station and a discharge station, a stationary supporting frame, upper and lower rotating turrets carried in said supporting frame, a plurality of freely rotatable can body supporting chucks carried by said lower turret, a seaming mechanism carried by said upper turret, said seaming mechanism comprising a housing, a plurality of rotating chucks mounted in said housing for rotating a can body and a can end, first and second operation seaming rollers adjacent each of said chucks, means in said housing for mounting said first and second operation seaming rollers on the same pivotal axis and for independent movement into an operating position, said means including a bearing support and concentric telescoping bearings carried in said support, a pair of concentric telescoping shafts mounted in said bearings and having lever arms extending radially from the lower ends thereof for supporting said first and second operation rollers respectively, a pair of cam tracks carried in said stationary supporting frame and surrounding said seaming mechanism, arms extending radially from the upper ends of each of said shafts, and cam followers mounted on said arms for cooperation with said cam track to move said first and second operation rollers independently into and out of operating position.

7. In a seaming head, a housing, a positively driven rotating chuck carried by said housing, a first operation seaming roller and a second operation seaming roller mounted in said housing on a common pivotal axis independent of each other and adjacent to said chuck, means operatively connected to each of said seaming rollers for independently moving said seaming rollers into and out of seaming position, a second means for positively driving said seaming rollers, said second means comprising a long tooth gear carried on the periphery of said seaming rollers which meshes with a gear mounted on said positively driven rotating chuck, said long tooth gears on said seaming rollers and said chuck remaining in meshing engagement throughout relative movement of said seaming rollers with said chuck.

References Cited in the file of this patent

UNITED STATES PATENTS

| | | |
|---|---|---|
| 693,303 | Norton | Feb. 11, 1902 |
| 1,424,499 | McCulloch | Aug. 1, 1922 |
| 1,752,912 | Kronquest | Apr. 1, 1930 |
| 1,763,458 | Coyle | June 10, 1930 |
| 1,996,381 | Lange | Apr. 2, 1935 |
| 2,170,055 | Johnson | Aug. 22, 1939 |
| 2,216,082 | Kronquest | Sept. 24, 1940 |
| 2,255,707 | Kronquest | Sept. 9, 1941 |
| 2,308,296 | Mills | Jan. 12, 1943 |
| 2,447,525 | Nordquist | Aug. 24, 1948 |
| 2,452,596 | Nordquist | Nov. 2, 1948 |